Figure 1:
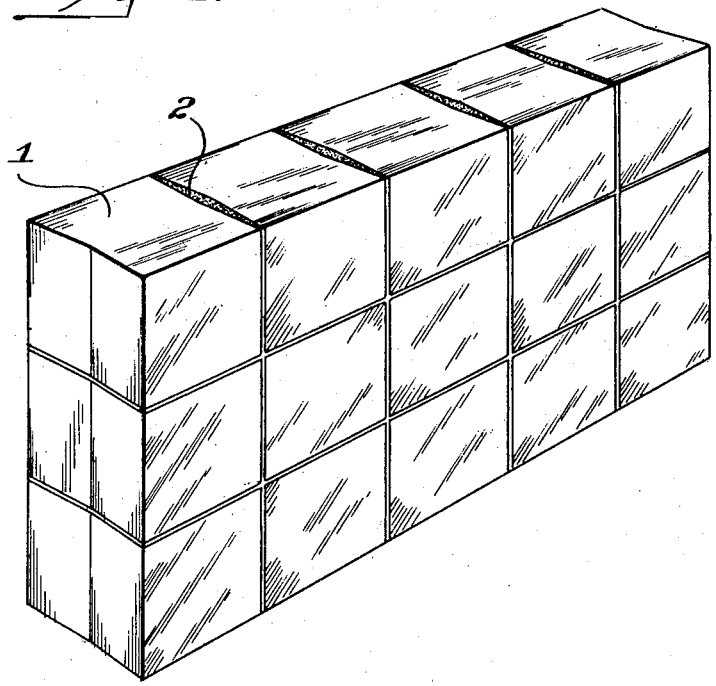

Oct. 20, 1942.　　R. R. McGREGOR ET AL　　2,299,552
COMPOSITION FOR USE IN MOTAR BONDING GLASS
AND THE LIKE ARTICLES
Original Filed April 18, 1939

1- GLASS.
2- MORTAR.
3- ETHYL SILICATE & VINYL ACETATE POLYMER.
4- VINYL ACETATE POLYMER.

Rob R. McGregor INVENTORS
Earl L. Warrick
BY Brown, Critchlow & Flick
Their ATTORNEYS.

Patented Oct. 20, 1942

2,299,552

UNITED STATES PATENT OFFICE 2,299,552

COMPOSITION FOR USE IN MORTAR BONDING GLASS AND THE LIKE ARTICLES

Rob R. McGregor, Swissvale, and Earl L. Warrick, West View, Pa., assignors to Corning Glass Works, Corning, N. Y., a corporation of New York Original application April 18, 1939, Serial No. 268,640. Divided and this application August 4, 1939, Serial No. 288,314

5 Claims. (Cl. 260—87)

This invention relates to compositions for use in mortar bonding articles having surfaces that are of glass or other vitrified material, i. e., glazed, and more particularly compositions for use in making mortar-bonded structures of glass blocks or other structural glass forms.

The adherence of mortar to glass or other vitrified, or glazed, surfaces, for instance to glass blocks, is much more variable than in the case of ordinary unglazed brick and similar porous bodies. Consequently, erratic results are obtained when it is attempted to lay up a glass block wall structure with mortar because the mortar may or may not adhere well, and ordinarily it is impossible to predict the result which will be obtained. The reasons for these variations are not certainly known although it seems that the adherence is affected by the water content of the mortar as well as by the time allowed to elapse between laying down the mortar and placing the glass upon it. Such structures are additionally unsatisfactory because the bond between mortar applied directly to glass or other glazed surface is not resistant to heat shock.

It has been found that if the glass or other glazed mortar-bearing surface is first provided with a coating of an appropriate lacquer made from synthetic resin, not only are more consistent bond strengths obtained, but also the bond is less susceptible to heat shock than is a direct glass-mortar bond. Various types of lacquers may be used for this purpose, either thermosetting or thermoplastic, although as far as we are aware the best bond strengths have been obtained with such thermoplastic resins as the acrylates, methacrylates and polyvinyl resins, particularly the polyvinyl acetates. Experience has shown, however, that such lacquers rapidly lose their adhesion to the glass in the presence of moisture, which introduces practical difficulties in the application of this solution of the problem. Thus, if the lacquer film becomes wet before the block is laid up with mortar the resultant reduced adhesion to the glass may cause the coating to be partially or wholly removed from the block during handling, with consequent unsatisfactory bond strength in the assembled structure. Again, the adherence of the lacquer to the glass may become weakened in the finished structure due to continuous or intermittent exposure to moisture, with weakening of the bond strength.

It is among the objects of this invention to provide coating compositions for use in making mortar bonds with structural glass articles, such as glass blocks or tiles, and other articles or units having at least their contiguous, or mortar-bearing, surfaces glazed, which are cheap, easily produced from available materials, and easily used, and which provide coatings that adhere satisfactorily to the surfaces under both dry and wet conditions, and to which mortar bonds strongly and satisfactorily, whereby to provide sustained, strong mortar bonds that are not seriously affected by moisture, and whereby the foregoing difficulties are repressed or eliminated.

Other objects will appear from the following description.

Figure 2:
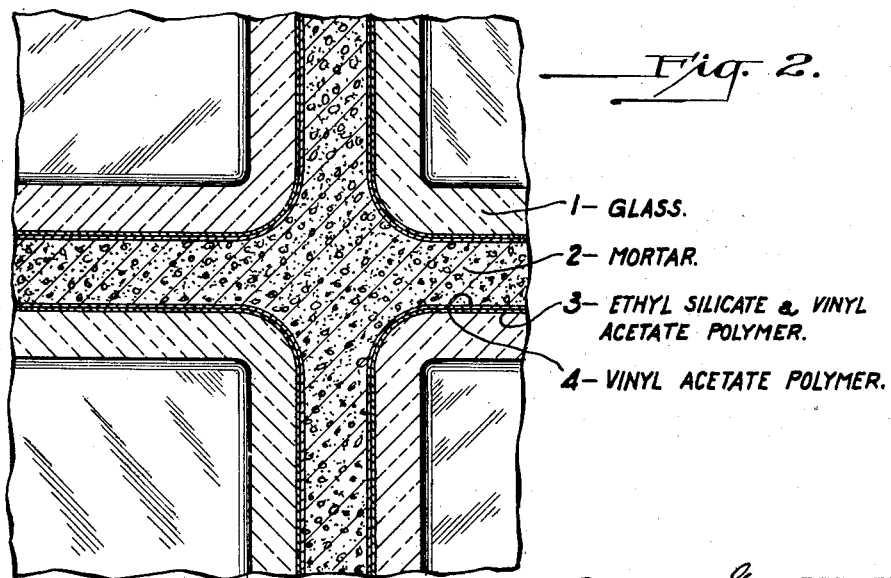

The invention will be described with particular reference to the accompanying drawing in which Fig. 1 is a perspective view of a mortar-bonded wall built from glass blocks using a composition in accordance with the invention; and Fig. 2 a fragmentary sectional view, on an enlarged scale, at the corner formed by four blocks in Fig. 1.

The invention is applicable, as noted above, to the mortar bonding of articles having at least their contiguous faces glazed. It is predicated upon our discovery that its stated objects are attained by interposing between the article and the resin coating previously used, a layer, or coating, of hydrolyzed silicate ester. In other words, in accordance with the invention there is applied directly to the mortar-bearing faces of the articles a layer of hydrolyzed silicate ester, and over this there is applied an overlying layer of vinyl acetate polymer to which the mortar is applied. We have found that such duplex, or two-layer, coatings adhere satisfactorily to glass and the like surfaces under both wet and dry conditions, that they form a strong and satisfactory bond with mortar, and that they overcome the difficulties which have heretofore confronted the art in the mortar-bonding of such articles into structures.

In the practice of the invention the inner coating is provided by the use of a liquid composition comprising hydrolyzed silicate ester and adapted to provide continuous, dried films thereof on the glazed or glass surfaces. In the preferred practice of the invention alkyl silicates are used to supply the hydrolyzed silicate ester layer, and most suitably ethyl silicate. Various other alkyl esters may be used such, for example, as methyl silicate or those of the higher alcohols. However, the hydrolysis of the methyl ester may be difficult to control, and although the higher esters can be hydrolyzed satisfactorily their proportional content of silica decreases as the molecular weight increases so that they are not as economical to use as those containing higher proportions of silica. For most purposes it is preferred, for the reasons noted, to use ethyl silicate because its hydrolysis can be effected and controlled readily, because it is readily available, and because it contains a relatively high proportion of silica.

An essential feature of the invention is that the silicate ester is hydrolyzed to prepare it for application to the glazed surface. As will be understood by those familiar with such matters, this may be accomplished by various procedures, but by way of illustration a satisfactory hydrolyzing practice is to mix 100 parts by weight of ethyl silicate, 100 parts by weight of 95 per cent ethyl alcohol, and 10 parts by weight of water. To this mixture there is added a small amount of acid, suitably one-half part by weight of a solution of 1 part of hydrochloric acid in 100 parts of water. The mixture is then boiled under a reflux condenser for one hour. Other proportions may, of course, be used. It will be observed that the amount of water used (1.7 mol equivalent) in this example is substantially less than that (2.0 mol equivalent) necessary to produce silica by complete hydrolysis of the ester so that the hydrolysis is but partial. This example typifies the extent of hydrolysis in the practice of the invention.

In the use of such compositions the partially hydrolyzed ethyl silicate composition, produced, for example, as just described, is applied directly to the glass or other glazed surface to form a coating thereon. The composition may be such that the coating produced consists, when dry, of partially hydrolyzed ethyl silicate, but in that case the best results are obtained by applying the outer layer of vinyl acetate polymer to the silicate layer just as the tackiness of the latter is disappearing. Such practice is obviously disadvantageous from a commercial production standpoint. The use of partially hydrolyzed ethyl silicate alone may cause difficulties also in that after a length of time which appears to be dependent upon the amount of water present during hydrolysis, films on rigid surfaces may craze or crack. For these reasons we prefer to plasticize the partially hydrolyzed silicate film, and this may be accomplished by the use of any suitable plasticizer which will inhibit crazing and cracking of the film upon standing and which will not detrimentally affect the adherence of the film to the glass and to the overlying vinyl acetate film.

We have discovered that particular advantages attend the use of vinyl acetate polymer as a plasticizer of the partially hydrolyzed ethyl silicate film. Not only does it adequately plasticize the film of partially hydrolyzed ethyl silicate, but also, and this is of particular advantage, it is unnecessary to apply the outer layer of vinyl acetate at any particular time, i. e., with such plasticized films the outer coating of vinyl acetate lacquer need not be applied when the tackiness of the partially hydrolyzed ethyl silicate layer is disappearing, but rather may be applied at any desired time interval thereafter. This is particularly advantageous in production methods.

Although the amount of vinyl acetate used for plasticizing the partially hydrolyzed ethyl silicate may be varied considerably, we have found that satisfactory results are obtained by using equivalent amounts of the partially hydrolyzed ethyl silicate solution and of vinyl acetate polymer solution. A satisfactory composition for producing the partially hydrolyzed silicate film is made from 10 per cent each of partially hydrolyzed ethyl silicate and vinyl acetate polymer with 80 per cent of ethyl alcohol (95 per cent). Such a film plasticized with vinyl acetate does not form a satisfactory direct bond with mortar, showing why there is used an outer film of vinyl acetate polymer applied over the coating of hydrolyzed silicate ester.

The block or other article is prepared for use by drying the partially hydrolyzed ethyl silicate film produced by the compositions of this invention, and then applying an overlying layer of vinyl acetate polymer solution. After the latter has dried the article is ready to be laid up with mortar. As described in our copending application Serial No. 268,640, filed April 18, 1939, now Patent No. 2,215,048, granted September 17, 1940, of which this application is a division, the vinyl acetate polymer which constitutes the outer layer of the coating is applied preferably in the form of a strong solution, say 30 per cent, in ethyl alcohol or other suitable solvent. Although various grades of vinyl acetate polymer may be used, we now prefer the 7-second variety because stronger solutions may be made from it than from the more highly polymerized products.

The composition may be applied in any desired manner, as by painting, spraying, dipping, roller coating, or the like, and the vinyl acetate polymer may be applied likewise. The films may be formed by allowing the solutions to dry in place, no heating being needed. Should it be desirable to do so, however, the articles may be heated after the application of the solution forming either or both layers, say to 110° C.

Such coatings possess satisfactory hardness, flexibility and strength, they adhere satisfactorily to the face of the article under wet and dry conditions, and they produce adequately strong mortar bonds. As evidencing this, glass blocks provided with the two-layer coating described above were tested to determine the modulus of rupture of the mortar bonds produced with such coatings. The results were as follows:

*Modulus of rupture—lbs./sq. in.*

| Dry | Wet |
|-----|-----|
| 200 | 151 |
| 204 | 189 |
| 203 | 173 |
| 211 | 187 |

Tests have shown also that similar structures made without the partially hydrolyzed silicate ester of this invention may exhibit similar dry strength but that the modulus of rupture wet is greatly lowered, even to only 20 pounds per square inch wet. These tests show the high resistance to moisture which is characteristic of bonds made in accordance with the invention.

Hydrolysis of the silicate ester is apparently necessary as appears from the fact that coatings produced from mixtures of vinyl acetate and unhydrolyzed ethyl silicate exhibited no better wet adherence than coatings made from vinyl acetate alone.

The use of the compositions provided by the invention is illustrated in the accompanying drawing in which Fig. 1 represents a wall structure made from glass blocks 1 laid up in courses, as shown, with mortar 2, the contiguous, or mortar-bearing, faces of the glass blocks 1 being provided with a coating comprising a layer, or film, 3 formed from a solution of partially hydrolyzed ethyl silicate and vinyl acetate polymer to which there is applied a layer 4 of vinyl acetate polymer. As appears from Fig. 2, mortar 2 is applied directly to film 4.

It will be understood that various modifications are permissible in the use of the compositions provided by the invention. Thus, although the outer layer of the coating is preferably vinyl acetate polymer it might be made from other lacquers or synthetic resins or mixtures of such materials provided they adhere satisfactorily to the underlying layer and to mortar. For instance, vinyl acetals might be used although in general they are not quite so satisfactory as vinyl acetate.

Also, although the invention has been described with particular reference to structural glass units, it is applicable to articles not consisting of glass but having at least their mortar-bearing surfaces glazed so that mortar does not adhere satisfactorily thereto. Similarly, the blocks 1 of Fig. 1 are shown schematically merely to illustrate the invention applied to glass blocks, and any of the various types or structures of such structural units may be treated according to the invention. Again, although it is necessary to apply the two-layer coating of the invention only to the motar-bearing surfaces, it will be understood that other parts, or the entire unit, may be coated similarly if that be desirable or expedient for any reason.

Also, the compositions may be colored, if desired, by admixture with pigment or dye. And as indicated, other plasticizers may be used, for instance other vinyl polymers.

As described in our aforesaid copending application, the outer film is preferably formed by the use of a solution of vinyl acetate polymer, which forms the film by evaporation and without the necessity for heating to induce polymerization which would be necessary if a solution of vinyl acetate monomer were used. If desirable for any reason, however, the monomer might be used.

According to the provisions of the patent statutes, we have explained the principle and mode of practicing our invention and have illustrated and described what we now consider to represent its best embodiment. However, we desire to have it understood that, within the scope of the appended claims, the invention may be practiced otherwise than as specifically illustrated and described.

We claim:

1. As a new composition of matter for coating glass and the like vitrified surfaces, a solution of silicate ester hydrolyzed with about 15 per cent by weight, based on said ester, of water, and a plasticizer selected from the group consisting of polymer of vinyl acetate and polymer of vinyl acetal, said solution being productive of films adherent to said surfaces under wet and dry conditions.

2. As a new composition of matter for coating glass and the like vitrified surfaces, a solution of ethyl silicate hydrolyzed with about 15 per cent by weight, based on said silicate, of water, and vinyl acetate polymer, said solution being productive of films adherent to said surfaces under wet and dry conditions.

3. As a new composition of matter for coating glass and the like vitrified surfaces, a solution containing substantially equal amounts by weight of silicate ester hydrolyzed with about 15 per cent by weight, based on said ester, of water, and vinyl acetate polymer, said solution being productive of films adherent to said surfaces under wet and dry conditions.

4. A composition according to claim 2, said hydrolyzed ethyl silicate and vinyl acetate polymer being present in said solution in substantially equal amounts by weight.

5. A composition according to claim 2 composed of about 10 per cent each of said hydrolyzed ethyl silicate and vinyl acetate polymer, and about 80 per cent of ethyl alcohol.

ROB R. McGREGOR.
EARL L. WARRICK.